United States Patent [19]

Blough et al.

[11] 4,307,983
[45] Dec. 29, 1981

[54] APPARATUS FOR GAINING ACCESS TO ENCLOSURES SECURED BY CYLINDER LOCKS WITH MINIMUM DAMAGE TO INTERNAL LOCK ELEMENTS

[75] Inventors: LeVone A. Blough, Maitland; David L. Gregory, Orlando, both of Fla.

[73] Assignee: Dyna Bolt Corporation, Altemonte Springs, Fla.

[21] Appl. No.: 137,811

[22] Filed: Apr. 4, 1980

[51] Int. Cl.³ .................... B23B 41/00; B23B 49/02
[52] U.S. Cl. ............................... 408/72 B; 408/80; 408/115 B; 29/426.4
[58] Field of Search ............ 408/72 R, 72 B, 115 R, 408/115 B, 80, 81, 84, 110, 241 R, 241 B, 1, 204; 29/426.4

[56] References Cited
U.S. PATENT DOCUMENTS 2,484,150 10/1949 Brown ............................ 408/204
2,797,598 7/1957 Labenz ........................... 408/80
3,849,019 11/1974 Green ............................. 408/1
4,261,093 4/1981 Steffen et al. .................. 408/1 R Primary Examiner—Leonidas Vlachos
Attorney, Agent, or Firm—Kenneth E. Darnell

[57] ABSTRACT

An apparatus for cutting away outer portions of the housing of a lock assembly in order to "pull" the lock assembly and gain entry into a safety deposit box or into an enclosure locked with a cam or similar lock, the invention allows entry into a locked enclosure with a minimum of damage to the lock. The apparatus comprises an annular guide member which fits about a safety deposit box lock or cam lock to position an annular cutting element relative to the lock so that a portion of the lock housing can be cut away to allow subsequent opening of the safety deposit box door. The annular cutting element extends through a central opening formed in the guide member and rotates within this opening, the depth of cut being controlled by a post member disposed internally of the cutting element.

12 Claims, 6 Drawing Figures

APPARATUS FOR GAINING ACCESS TO ENCLOSURES SECURED BY CYLINDER LOCKS WITH MINIMUM DAMAGE TO INTERNAL LOCK ELEMENTS

BACKGROUND OF THE INVENTION

1. Field of the Invention

The invention relates generally to apparatus for gaining legitimate emergency entry into a safety deposit box or similar enclosure secured by a cam lock or similar cylinder lock. In particular, the invention relates to an apparatus capable of cutting away peripheral portions of such a lock to allow access to the secured enclosure with minimum damage to the lock.

2. Description of the Prior Art

Various circumstances require the emergency removal of locks from safety deposit boxes or other enclosures secured by cam locks or similar cylindrical locks. These unusual circumstances usually result from a loss of the key used to operate the lock. The most common practice previously employed by locksmiths charged with gaining entry to such secured enclosures results in extensive damage to and even total destruction of the lock. This conventional practice involves the drilling, tapping and subsequent pulling of the lock, this practice not only being destructive to internal elements of the lock, but also requiring a substantial amount of time to accomplish the job. Even when the lock itself is not internally drilled, conventional practices have provided for drilling one or more holes in the enclosure door in order that locking levers can be raised sequentially or drilled to defeat the lock. These alternate practices also destroy at least certain elements of the lock, require replacement of the enclosure door and are exceptionally time consuming.

The substantial amount of time required for defeating cylinder locks and the resulting damage to the locks has previously prompted efforts to improve the conventional techniques. In particular, McLaughlin, in U.S. Pat. No. 3,619,887, provides a tool intended to forceably pull a cylinder lock from a secured enclosure, the tool comprising a channel-shaped body having bevel flanges for engaging the exposed rim of the cylinder lock behind the rim, the tool being then pulled away from the enclosure by an attached implement which allows sufficient mechanical advantage to forceably pull the lock from the enclosure. Use of this prior art tool unavoidably causes damage to certain internal portions of the lock and usually damages the door of the enclosure. Further, cylinder locks which are recessed or "counter sunk" into the door of the enclosure, such as is usually the case with safety deposit box locks, cannot be pulled by such prior art tools.

The present invention finds solution to the problems thus encountered by providing apparatus capable of accurately cutting away an outer flange portion of the housing of a cylindrical lock assembly, this outer flange portion typically acting to retain the lock assembly in the door of an enclosure secured by the lock. The present apparatus allows rapid and positive location of a cutting element relative to the outer flange portion of the lock housing such that only the housing itself is damaged during the cutting operation. The present apparatus further provides structure which limits the penetration of the cutting element into the locking assembly, the cutting penetration being sufficient to cut through the outer flange, but insufficient to unnecessarily damage other portions of the locking assembly and/or the enclosure door including a structure mounting the locking assembly to the door. Use of the present invention further allows entry to be gained into the secured enclosure much more rapidly than is possible with prior apparatus, a locksmith therefore being capable of reducing job time to a substantial degree while actually causing less damage to the enclosure and the lock securing said enclosure. Replacement of parts necessary to reestablish the integrity of the lock and thus the security of the enclosure is also minimized with additional economies being thus realized.

SUMMARY OF THE INVENTION

The invention provides an apparatus for gaining legitimate access to enclosures secured by cylinder locks, such as safety deposit box locks and cam locks, with a minimum of damage to internal lock elements. Use of the present apparatus requires a minimum of time for gaining access to the secured enclosure and results in damage only to the housing of the lock, the lock being restored merely by the provision of a replacement housing. The present apparatus thus allows more rapid completion of the job of gaining access to a safety deposit box or similar enclosure by a locksmith or other authorized person while also facilitating the repair of the secured enclosure and reestablishment of the security thereof.

The apparatus comprises a cutting element which has a conformation similar to a conventional hole cutting tool such as a hole saw. This cutting element is mounted on an appropriate arbor element, the arbor element having an anteriorly disposed bar element which fits into the chuck of either a manual or an electric drill which is used to actuate the present apparatus. The arbor element is further provided with a hollow shaft which extends into the interior of the cutting element, the hollow shaft being adapted to receive a depth-limiting post member which extends toward the circular opening in the cutting element to control the depth of cut.

The present apparatus further comprises an annular guide member having a central opening through which the cutting element extends into cutting relation with the housing of the lock which is to be removed from the enclosure door. The opening in the guide member is sufficient to allow rotation of the cutting element therewithin with a minimum of friction while acting to positively locate the cutting element such that only the desired portions of the cylinder housing of the lock are caused to be cut. The guide member is provided with an annular bevel or similar extension formed peripherally about the opening on the surface of the guide member which directly opposes the enclosure door and lock. This peripheral bevel is sized to fit flushly into a recess in the enclosure door in those situations where the lock is countersunk. Alternately, the peripheral bevel is sized to fit over the housing of the lock including an outer flange portion thereof, such as with a cam lock, in order that the cutting element guided by the guide member is properly positioned to cut away the outer flange portion of the cylinder housing, this outer flange portion often being referred to as the "nose" or "horn" of the lock housing.

Centering apparatus, such as disclosed by Giles in U.S. Pat. No. 3,923,413, and by Lavering et al in U.S. Pat. No. 3,381,551, are known for allowing a hole to be drilled in a substrate by a hand-held guide member. Structures such as are disclosed in these patents have apertures provided therein through which a drill bit can be inserted in order to facilitate the boring of a hole having an axis perpendicular to the surface of the substrate into which the hole is bored. However, these prior guide members are incapable of use in the environment of the present invention due to structural differences hereby provided and which are necessary to the practice of the present invention.

It is therefore an object of the present invention to provide apparatus for gaining access to enclosures secured by cylinder locks with a minimum of damage to internal lock elements, the present apparatus being particularly useful for removing locks used to secure safety deposit boxes and similar enclosures.

It is another object of the invention to provide an apparatus capable of accurately and positively cutting away the nose or horn of the housing of a cylindrical lock assembly such as a cam lock or similar lock wherein the nose of the housing acts to retain the lock in the door of an enclosure secured by the lock, internal elements of the lock being undamaged during lock removal.

It is a further object of the invention to provide a lock-defeating apparatus particularly capable of removing a cylinder lock from a secured enclosure to allow access to the enclosure with a minimum of damage to the lock and enclosure door, thereby allowing reuse of the lock by a mere replacement of the lock housing.

It is a still further object of the invention to provide a lock-defeating apparatus capable of removing a lock from a safety deposit box or similar enclosure with minimum damage to the lock and with a substantially decreased job time relative to prior art practices, the present apparatus thereby enabling a locksmith or other authorized person to gain authorized entry into such a secure enclosure under emergency conditions with a minimum expenditure of time.

Further objects and advantages of the invention will become more readily apparent in light of the following detailed description of the preferred embodiments of the invention.

DESCRIPTION OF THE PREFERRED EMBODIMENTS

Figure 1:
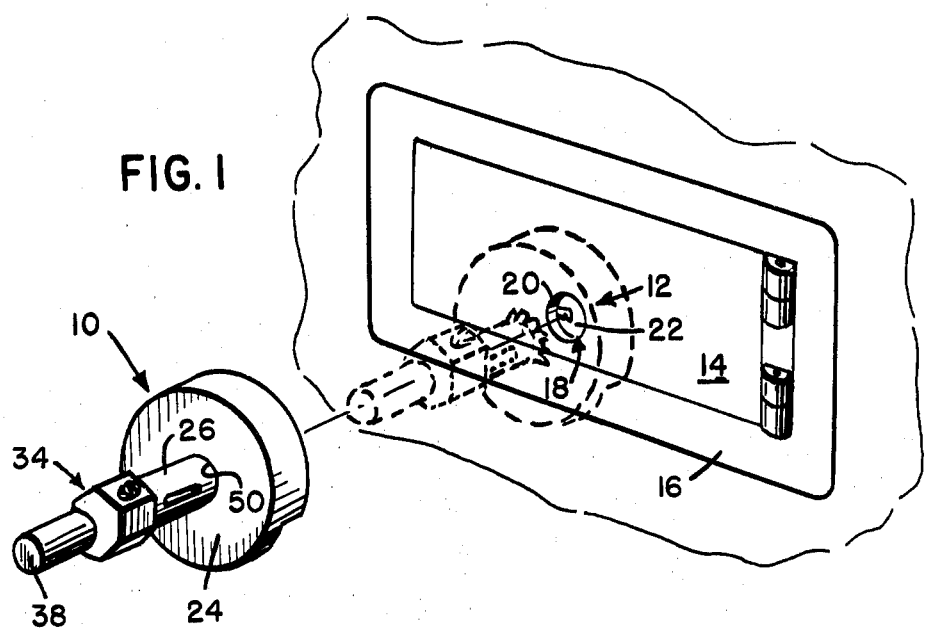
FIG. 1 is a perspective view of the present apparatus illustrating the operative environment of the invention.

Referring now to the drawings and particularly to FIG. 1, the present apparatus is seen at 10 in a use environment wherein cylinder lock 12 is to be removed from door 14 of a safety deposit box 16. It should be understood that the apparatus 10 is particularly useful for emergency removal of locking assemblies such are generally referred to as cylinder locks, that is, those locks which are contained within a substantially cylindrical housing 18, the housing 18 being provided with an annular flange 20 which is also referred to as a "horn" or "nose". Such locks are retained within an enclosure door, such as the door 14, by means of the flange 20. Accordingly, removal of the flange 20 allows trunnion 22 of the lock to be removed from the door, thereby to allow access to the box 16 or other enclosure. Locks typically referred to as cam locks, such as will be described hereinafter relative to FIG. 6, can also be readily defeated through use of the apparatus 10 in emergency situations such as occur when the key to the secured enclosure is lost or otherwise unavailable. As can be seen both in FIG. 1 and in FIG. 5, the cylinder lock 12 typically used to secure an enclosure such as the safety deposit box 16 is counter sunk into the door 14, the present apparatus 10 particularly providing means for gaining access to the secured enclosure with a minimum of damage to the internal elements of the lock 12 and with essentially no damage to the door 14. Further, access to the secured enclosure can very rapidly be accomplished through use of the present apparatus 10.

The present apparatus 10 is seen to particularly comprise a locator ring 24 which effectively functions as a guide element for locating a circular cutting blade 26 in a desired position relative to the cylinder lock 12 so that the flange 20 of said lock 12 can be cut away from the housing 18 of the lock. The circular cutting blade 26 is seen to be substantially cylindrical in conformation and is formed with cutting teeth 28 on the free end thereof. The blade 26 can take the form of a "hole saw" or similar available cutting element which is capable of cutting through the metal of which locking assemblies are formed. As is particularly seen in FIG. 5, the cutting blade 26 is provided with internal threads 30 which securely mate with external threads 32 formed on a medial portion of arbor 34, the cutting blade 26 thus being mounted to the arbor 34 as can be particularly seen in FIGS. 2 and 5.

The arbor 34 is seen to comprise a substantially cylindrical body portion 36, the body portion 36 tapering anteriorally to a mounting post 38 which is received into the adjustable chuck (not shown) of a drill (not shown). The drill provides motive power to rotate the arbor and the blade 26 mounted thereto for cutting through the flange 20 of the lock 12. While the apparatus 10 could be mounted either permanently or removably to a manual drill, the apparatus 10 is most expeditiously utilized in an electric drill, the mounting post 38 of the arbor 34 being readily received into the adjustable chuck of such a drill in the same manner as a mounting post for a drill bit is received into a drill chuck. The drill used to operate the present apparatus is not illustrated since such illustration is not necessary to an understanding of the invention.

The arbor 34 is also seen to have a hollow cylindrical depth post housing 40 extending from the side of the body portion 36 opposite the mounting post 38. The housing 40 extends from the body portion 36 of the arbor 34 immediately outwardly of the external threads 32 formed on said arbor 34. The housing 40 has an outer diameter which is preferably sized to receive the cylindrical body of the circular cutting blade 26 thereover such that the housing 40 is essentially received within the cylindrical internal cavity of the blade 26. The purpose of the depth post housing 40 is to receive into the interior thereof a depth post 42, which depth post 42 acts to limit the depth of cut into the lock 12. The anterior end of the depth post 42 is preferably inserted into the depth post housing 40 prior to assembly of the blade 26 onto the arbor 34. The cylindrical cavity defined by the housing 40 is continued into the interior of the body portion 36 of the arbor 34, this cavity communicating with a threaded cavity 44 formed in the body portion 36 perpendicularly to the longitudinal axis of the arbor 34, a set screw 46 being received into the threaded cavity 44 to engage the anterior end of the depth post 42 for positively locating said post 42 within the arbor 34. The inner end of the depth post 42 abuts that portion of the set screw 46 which extends into the cavity disposed interiorly of the body portion 36, thereby to set the depth post 42 in a desired position to properly limit the depth to which the blade 26 can cut on assembly of the several elements of the apparatus 10 as described herein.

Figure 2:
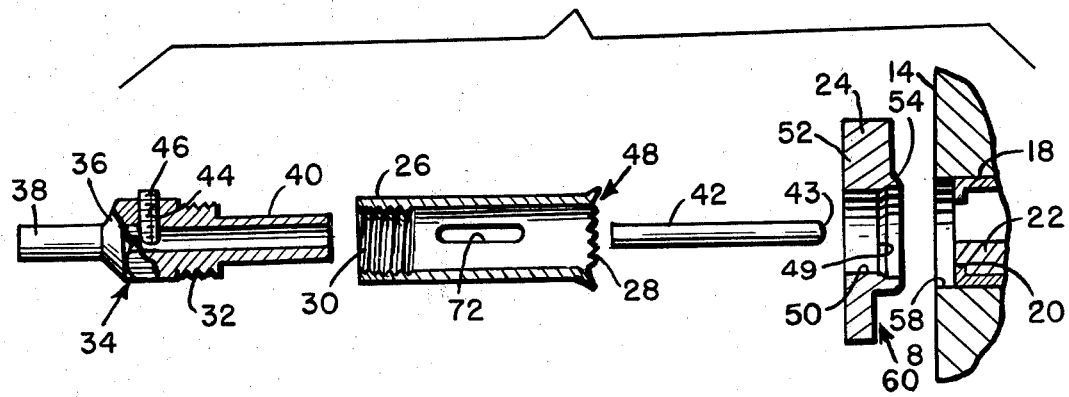
FIG. 2 is an exploded assembly view in elevation of the several component elements of the present apparatus.
Figure 5:
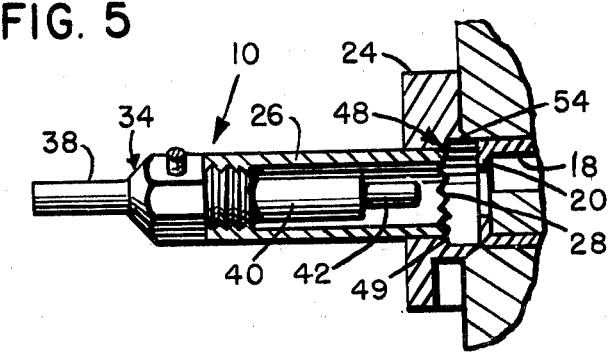
FIG. 5 is an assembly view in partial section of the present apparatus in the use environment.

As can be seen best in FIGS. 2 and 5, the teeth 28 flare slightly outwardly from the free end of the blade 26. Prior to mounting to the arbor 34, the blade 26 must be fitted inner end first through the opening 50 from that face of the locator ring 24 which opposes the lock 12. Due to the flared teeth 28, an annular shoulder 49 formed interiorly of the opening 50 prevents the blade 26 from being pulled through the opening 50, this structure thus preventing use of commercially available blades which are improperly sized to function properly with the intended depth post 42. The free end of the cutting blade 26 is seen to extend through the opening 50 of the locator ring 24 and into direct cutting engagement with the flange 20 of the lock 12, the cylindrical body of the cutting blade 26 being received within the opening 50 with sufficient clearance to allow accurate and positive positioning of the blade 26 while allowing unencumbered rotation of said blade on actuation of the apparatus 10 by the drill to which the arbor 34 is connected.

Figure 3:
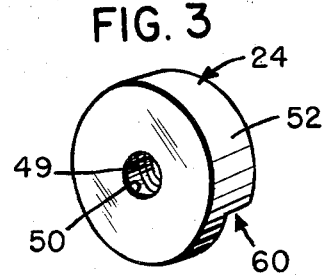
FIG. 3 is a perspective view of the guide element of the present apparatus shown from the side thereof into which the cutting element extends.
Figure 4:
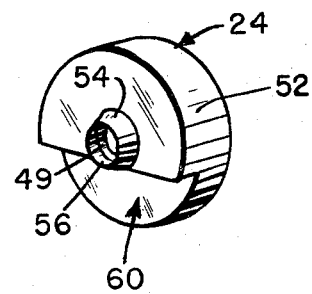
FIG. 4 is a perspective view of the guide element of the present apparatus shown from the side thereof which opposes the lock and enclosure door.

The locator ring 24 can also be seen in FIGS. 3 and 4 to comprise a disc-like body portion 52 which is grooved about the outer periphery thereof to facilitate manual grasping and holding of the ring 24, it being necessary to manually hold the ring 24 in position over the lock 12. When the locator ring 24 is used in a situation, such as is particularly seen in FIG. 5, where the lock 12 is recessed into the enclosure door 14, an annular bevel 54 is provided centrally of the locator ring 24 about the periphery of the opening 50, at least a distal annular edge portion 56 of the bevel 54 extending into recess 58 formed in the door 14, thereby allowing the locator ring 24 to be accurately and positively positioned relative to the lock 12 so that the cutting portion of the blade 26 extending through said opening 50 engages the flange 20 for cutting said flange away from the housing 18 of the lock 12. The body portion 52 of the locator ring 24 is further seen to be cut away over a lower semicircular portion thereof at 60, thereby to more readily accommodate protruding structural portions of certain safety deposit boxes or similar enclosures. This cut away portion 60 is provided to allow the locator ring 24 to fit flushly against safety deposit box doors of any known description.

In those situations where the housing of a cylinder lock actually extends outwardly from an enclosure door in which the lock is mounted, such as is the case with the cam lock illustrated in FIG. 5, a locator ring 62 is provided which need not have a bevel such as the bevel 54. In such situations, an opening 64 provided in the locator ring is sized to receive outwardly extending peripheral flange portions 66 therewithin, the cutting blade 26 on extension through the opening 64 thus being accurately and positively positioned relative to the flange portion 66 for cutting of said portion 66 away from housing 68 of cam lock 70 in a manner substantially identical to the procedure described above relative to FIG. 5. In both situations, the depth post 42 is seen to limit the depth of cut which can be obtained, the position of the depth post 42 being positively predetermined depending on the conformational characteristics of the particular lock which is to be defeated. As particularly seen in FIG. 5, the depth post 42 can be provided with a rounded distal end portion 43 which extends toward the opening defined by the circular toothed cutting portion of the cutting blade 26, the end portion 43 of the depth post 42 terminating at a predetermined distance from said opening to limit the depth of cut by abutting against outer surface portions of the lock when the blade 26 has cut to the predetermined depth necessary to remove the flange 20 of FIG. 5. The structure seen in FIG. 6 operates similarly.

It is to be understood that varying designs and sizes of the cylinder locks with which the present apparatus 10 is useful requires locator rings 24, cutting blades 26, and depth posts 42 of differing sizes and designs. In particular, a locator ring such as the ring 24 is provided with the bevel 54 as described above in those situations where a recessed lock is to be defeated. Locator rings having bevels also require openings, such as the opening 50, of differing sizes (the bevel 54 associated with the opening 50 being sized in direct relation to the size of the opening) in order to allow circular cutting blades, such as the blade 26, of differing sizes to be received through said locator rings in order to match the diameter of the cut provided by a particular blade 26 to the size of the flange which must be cut away from the housing of a particular lock. In effect, each cutting blade 26 of differing size requires a correspondingly sized locator ring 24. Further, the depth post 42 is also sized to allow the necessary depth of cut for the particularly sized locator rings and blades.

The locator rings 24 which are particularly intended to be used with locks having internally extending flange portions are preferably provided with the shoulders 49 since it is necessary to prevent the use of certain commercially available blades 26 if the depth post 42 intended for use with a particular blade 26 and ring 24 is to be effective to prevent too great a depth of cut into the lock. The blade 26 intended for use in this situation has the outwardly flared teeth 28 seen at 48 in FIGS. 2 and 5. The teeth 28 are intentionally flared so that only a blade so formed can be used with the intended ring 24, commercially available blades not being receivable into the ring 24 due to the provision of the shoulder 49 within the opening 50 of the ring 24. As will be noted in FIG. 6, cutting blade 65 need not have flared teeth since the blade 65 is preferably intended to cut flange portions from a cam or similar lock, which flange portions extend outwardly from the lock. Since the depth of cut is less critical in this situation, the locator ring 62 does not need to be formed with a reduced-in-diameter portion such as the shoulder 49 of the ring 24. The cutting blade 65 can thus be first assembled to the arbor 34 and the free end of the blade 65 extended through the ring 62 from the outward face of said ring 62. The blade 26, as aforesaid, must be inserted into the opening 50 of the ring 24 from the inward face of said ring 24 and then mounted onto the arbor 34.

While a number of depth posts of differing length can be used according to the invention, it is possible to use a single depth post with one or more spacer washers of predetermined thickness in order to accommodate situations where a different depth of cut is necessary. As described above, it is possible to use depth posts of different lengths. It is usually possible to use a single arbor with the various combinations of locator rings, cutting blades, and depth posts. It is also to be understood that certain sizes of the locator rings, cutting blades and depth posts can accommodate a variety of similarly sized and similarly designed locks.

The cylindrical body of the cutting blade 26 can optionally be provided with slots 72 formed therein, the slots 72 acting to allow cutting of the metal being cut from the lock to exit the interior of the blade 26, thereby to prevent build-up of material within the interior of said blade.

Figure 6:
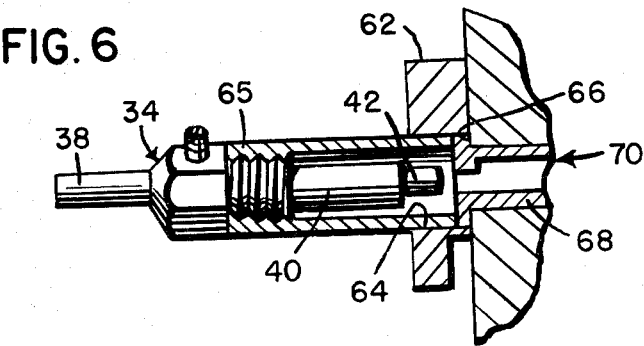
FIG. 6 is an elevational view in section of a portion of the present apparatus disposed in cutting relation to a cam lock mounted in an enclosure door.

Referring again to FIG. 5, it will be understood by those having ordinary skill in the art that, using conventional techniques, the trunnion 22 of lock 12 can be readily removed from the door 14 after the flange 20 has been cut away from the housing 18. Entry into the box 16 can readily be accomplished through the use of a tool such as pliers, a "shoe" (not shown) which is connected to the trunnion 22 being manipulated in a known fashion to allow entry into the safety deposit box 16 or similar enclosure. As seen in FIG. 6, on cutting away of the flange portion 66 from the housing 68 of the cam lock 70, the lock 70 can be pushed out the back of the door to release the conventional tail bar or locking shaft (not shown) which conventionally comprises a rearward portion of the lock 70.

As can be seen from the description given above, locks, such as cylinder lock 12, can be defeated under emergency conditions by removal of an interior flange, such as flange 20, or an exterior flange, such as the flange portion 66, without damage to an enclosure door or to internal elements of the lock. Use of the apparatus 10 in the intended environments merely results in damage to the housing 18, such as is seen in FIG. 6, it being possible to readily and inexpensively replace the appropriate housing and thus reuse the lock. Further, use of the apparatus 10 substantially reduces the time required to gain access to an enclosure secured by a lock such as the cylinder lock 12 or cam lock 70.

Within the scope of the present disclosure, it is also to be understood that the cylindrical locks referred to herein comprise automobile ignition locks, automobile door and trunk locks, and other locks which are formed either with an annular "nose" or "horn", i.e., such as the annular flanges 20 and 66. The invention is useful also with locks which have raised portions extending from essentially cylindrical housings, these raised portions not necessarily being continuous about the full periphery of the lock housings. Certain of these locks have housing which are substantially circular in section but which have "flattened" sides. In essence, these various locks have flange-like portions, whether continuous in an annular fashion or discontinuous, which extend either radially inwardly or outwardly from the locking housing, it being possible to use the apparatus 10 to cut away these structural elements to allow trunnion removal and other conventional techniques for gaining entry into an enclosure or to open a lock such as an automobile ignition lock. Accordingly, use herein and especially in the claims of the term "cylinder lock" is understood to refer to locks as generally and particularly thus described.

It is believed apparent that the concepts explicitly illustrated and described herein can be practiced other than as expressly described without departing from the scope of the invention. Accordingly, the invention is intended to be understood in light of the description provided herein, but is to be properly limited in scope only by the recitations of the appended claims.

What is claimed is:

1. Apparatus for removing housing portions of a lock such as a cylinder lock in order to gain access to an enclosure or other structure secured by the lock with a minimum of damage to the lock and associated structure comprising:

means for cutting said housing portions, the cutting means including an annular cutting edge being dimensioned to engage the housing portions when positioned in opposite relation thereto; and locator means for positioning the cutting means in cutting relation to the housing portions, the locator means having a channel extending therethrough for receiving the cutting means and for maintaining the cutting means in position relative to the housing portions, the channel forming openings on opposite side surfaces of the locator means, the locator means further having structural portions disposed about the opening on the surface of said locator means normally opposite the lock for positively engaging the housing portions, the cutting edge of the cutting means being accurately positioned for cutting the housing portions on insertion of the cutting means through the channel of the positioned locator means to engage said housing portions.

2. The apparatus of claim 1 wherein the channel in the locator means is formed with a shoulder which reduces the diameter of the channel interiorly thereof, that portion of the channel disposed nearest the structural portions being of greater diameter than the outwardly disposed portion of said channel, and wherein the cutting edge is of a greater diameter than the outwardly disposed portion of said channel, body portions of the cutting means fitting within and through the outwardly disposed portion of said channel and the cutting edge fitting within and through the portion of the channel nearest the structural portions.

3. The apparatus of claim 1 and further comprising:
    depth-limiting means carried by the cutting means for controlling the depth of cut of the cutting edge into the housing portions of the lock.

4. The apparatus of claim 3 wherein the cutting means comprises:
    an arbor having a central body portion and an elongated mounting post extending from one end thereof, the mounting post being dimensioned to be received within an adjustable chuck of a rotary drill, the arbor further comprising means for mounting the depth limiting means to the arbor.

5. The apparatus of claim 4 wherein the depth-limiting means comprise a cylindrical post member and wherein the mounting means comprise a hollow cylindrical housing extending from the end of the arbor opposite the mounting post, the post member being received into the hollow cylindrical housing to a depth such that a free end of the post member extends toward the cutting edge and terminates in a predetermined spaced relation thereto, the apparatus further comprising means for positioning the post member within the arbor at a predetermined location.

6. The apparatus of claim 5 wherein the holding means comprise a set screw mounted in the arbor, the end of the post member which is received within the hollow cylindrical housing abutting the set screw to positively position the post member within the arbor in a predetermined relation to the cutting edge.

7. The apparatus of claim 4 wherein the cutting means further comprise a hollow cylindrical cutting blade, the cutting edge being formed on one end of said blade, the blade receiving a portion of the arbor opposite the mounting post thereinto, the cutting means further comprising means for mounting the blade to the arbor.

8. The apparatus of claim 7, wherein the means for mounting the blade to the arbor comprise threads formed externally on a portion of the arbor and mating threads formed internally on the end of the cutting blade opposite the cutting edge, the respective threads mating to allow positive and rapid assembly and disassembly of the blade with the arbor.

9. The apparatus of claim 1 wherein the locator means comprises a disc-like body member adapted to be held in opposing relation to the lock, the channel extending substantially centrally therethrough from a first planar surface of the body member to a second planar surface opposite said first planar surface, the end of the cutting means opposite the cutting edge being received through the channel from the first planar surface of the body member, the first planar surface essentially facing the lock, the structural portions of the locator means being disposed about the opening of the channel located on the first planar face of the body member.

10. The apparatus of claim 9 wherein the channel is formed with a shoulder which reduces the diameter of the channel interiorly thereof, that portion of the channel nearest the first planar surface being of greater diameter than the outwardly disposed portion of the channel beyond the shoulder, and wherein the cutting edge is flared outwardly from body portions thereof and is of greater diameter than both said body portions and said portion of the channel beyond the shoulder, the cutting edge fitting within and through the portion of the channel nearest the first planar surface.

11. The apparatus of claim 9 wherein the structural portions comprise an annular bevel which surrounds the periphery of the opening on the first planar surface and which is dimensioned to fit flushly with perimetric edge portions of a recess formed in the secured enclosure within which recess the lock is received, the cutting edge of the cutting means thus being accurately and positively positioned relative to the housing portions of the lock on fitting of the bevel of the locator means into the recess and the insertion of the cutting means through the opening to engage the cutting edge with the lock.

12. The apparatus of claim 9 wherein a chord-like recess is formed in the second planar surface for accomodating protruding portions of the enclosure.

* * * * *